United States Patent [19]

Ziemann

[11] Patent Number: 4,862,374
[45] Date of Patent: Aug. 29, 1989

[54] NAVIGATIONAL PLOTTING SYSTEM

[76] Inventor: Erich T. Ziemann, 1534 Parmenter St., Middleton, Wis. 53562

[21] Appl. No.: 193,610

[22] Filed: May 13, 1988

[51] Int. Cl.⁴ .............................................. G06F 15/50
[52] U.S. Cl. .................................... 364/449; 342/452; 340/995
[58] Field of Search ............... 364/443, 444, 449, 450, 364/452; 342/452; 340/990, 995; 73/178 R

[56] References Cited

U.S. PATENT DOCUMENTS

| | | | |
|---|---|---|---|
| 3,967,098 | 6/1976 | Harnagel et al. | 364/443 |
| 4,053,893 | 10/1977 | Boyer | 340/995 |
| 4,135,190 | 1/1979 | Dimatteo et al. | 342/452 |
| 4,192,002 | 3/1980 | Draper | 364/449 |
| 4,393,448 | 7/1983 | Dunn et al. | 364/449 |
| 4,400,780 | 8/1983 | Nagao et al. | 364/449 |
| 4,428,057 | 1/1984 | Setliff et al. | 364/449 |
| 4,468,743 | 8/1984 | Dunn et al. | 364/520 |
| 4,513,378 | 4/1985 | Antkowiak | 364/450 |
| 4,514,810 | 4/1985 | Ito et al. | 364/449 |
| 4,590,570 | 5/1986 | Rader | 364/452 |
| 4,660,037 | 4/1987 | Nakamura | 364/449 |

OTHER PUBLICATIONS

Brochure for Chartlink by Datamarine, Pocasset, MA, Undated.
Advertisement for Mariner 300 Track Plotter from II Morrow, Inc., Undated.
Page from Brochure, Navigational Products of Nav-Aids, date unknown.
Specification DXL 6600 Loran See by Apelco, date unknown.
MasterNav 4000 by Admiral Marine Electronics, Inc., Advertisement in *Ocean Navigator* No. 20, date unknown.
Nav-Add 2000 by Si-Tex, Advertisement in May, 1988 issue of *Motor Boating & Sailing*.
NavGraphic by Trimble Navigation, advertisement in *NMEA News*, Mar./Apr. 1988.

Primary Examiner—Gary Chin
Attorney, Agent, or Firm—Quarles & Brady

[57] ABSTRACT

A navigational plotter includes a light-transmissive LCD graphical display which serves as a window-like element in relation to a map placed underneath it. The map is calibrated to the plotter by moving a calibration cursor on the display to two known points diagonally displaced on the map, by manually entering the latitude and longitude of these known positions and by commanding the device to associate each point with its respective longitude and latitude. Navigational positions and navigational paths are then related to these points and displayed at the appropriate locations on the graphical display, where they appear over the appropriate locations on the underlying map.

7 Claims, 6 Drawing Sheets

NAVIGATIONAL PLOTTING SYSTEM

SUMMARY OF THE INVENTION

1. Field of the Invention

This invention relates to navigational plotting systems and more particularly to automatic devices for determining and graphically displaying the position of a traveling craft as it is guided over a course to a desired destination.

2. Background Art

In many instances of navigation, it is desirable to record successive positions of a vessel or vehicle on a plotting surface to provide a record of the vessel's progress. In commercial fishing, it is helpful to graphically display the area that a vessel traverses over a predetermined fishing ground so that the pilot of the vessel may accurately control his vessel for complete coverage.

Navigational plotting systems are also useful in air-sea search and rescue operations to give the navigator a picture of the search area, to assure a complete search and to prevent a duplication of search efforts.

In a typical navigation plotting system, the track of the vessel or vehicle is graphically displayed as progress is made towards a destination such as a dock, harbor or place of refuge. The track of the vessel may also be displayed relative to navigational hazards.

Devices have been known for automatically plotting a progression of positions in relation to a map or other representation of a navigation chart. In Dunn et al., U.S. Pat. No. 4,468,743, a plotting device is controlled by a microelectronic processor which drives a pen across a paper chart. After several plots the chart should be replaced. The equipment is best suited for a stable and sheltered environment, which is not always readily available in smaller sailing vessels.

Dunn et al. teaches calibration based on a single reference point and radio signals from LORAN transmitting stations. These stations are situated at known locations to beam signals to craft offshore or on large inland waters.

The operation of a device that depends completely on radio signals from the LORAN transmitting stations is somewhat sophisticated and complicated. It might be compared to radar navigation by aircraft during times of low visibility.

There is a need for a lower-cost device which is less complex to operate, more rugged and most importantly, a device which makes use of visual orientation as well radio-controlled navigation. Such a device would be better suited for smaller watercraft than the devices of the prior art.

SUMMARY OF THE INVENTION

The invention is incorporated in an electronic plotter which may be a peripheral unit or which may be combined with a LORAN navigational receiver. The plotter includes a microelectronic processor for processing inputs from the user, for running a graphical display and for receiving and processing positional signals from the LORAN navigational receiver.

In place of a pen-and-chart plotter or a CRT, the graphical display of the invention is a thin, window-like element. A map or chart can be placed behind this element. The element is at least semi-transparent—it has sufficient visual quality to allow the information on the map to be seen through the window. It is also an electronic element with pixels that can be selectively illuminated to display and superimpose a moving cursor, a navigational positions or a navigational path on the map.

When navigating near the coast or on inland waters the navigator can often determine the area of the map in which the vessel is situated by visual observation of certain features of the area. This provides a basis for initializing the plotter so that radio signals subsequently received through the LORAN receiver can be related to a specific map.

The graphical display includes two reference indicia, which are provided at separate and diagonally opposite locations on the graphical display. These reference indicia may be physical marks made on the screen of the display or they may be additional matter displayed by illuminating selected pixels in the display. Still further pixels can be illuminated to show a cursor that moves across the display.

The plotter has a keypad with keys for numeric entries and with keys for operating a cursor and with keys for entering commands for calibrating the plotter to a selected map.

The microelectronic processor is operable to process key inputs and to drive the graphical display in an initialization sequence for calibrating a selected map to radio-navigation signals to be received through the LORAN receiver.

In this sequence a map is positioned behind the graphical display with the area of interest presented in the viewing area. With appropriate key inputs, the cursor is moved to the first reference mark, which corresponds to a point on the map of known latitude and longitude. With further key inputs the latitude and longitude are entered. With a further key input, the latitude and longitude are associated with the first reference mark for subsequent processing of positional data.

With further key inputs the cursor is moved to the second reference mark, which corresponds to a second point on the map of known latitude and longitude. Key inputs are used to enter latitude and longitude and to associate the latitude and longitude with the second reference mark.

The microelectronic processor is interfaced through communication circuitry to the LORAN receiver to receive positional data signals, and once the calibration sequence has been completed, the microelectronic processor will relate incoming positional data signals to the calibrated points and to the particular map associated with those points. The microelectronic processor can then generate signals to cause navigational positions and navigational paths to be shown on the display, where they are superimposed on the map.

The microelectronic processor is advantageous for performing any necessary conversion of the signals from the LORAN receiver to positions on the graphical display. Scaling factors based on the scale of a particular map can be calculated from the two calibrated points, for application to the incoming navigation signals. Other correction factors based on time delays in receiving radio-navigation signals can also be applied through processing in the microelectronic processor.

Once the calibration function has been performed for a certain map or area of interest, the calibration points can be associated with a chart number and stored in memory for later recall and use with that map.

Navigational paths, comprising groups of navigational signals received over a time period, can be associated with a route number and stored in memory for later recall.

The plotter of the invention is advantageous over the pen-and-chart type plotter in that it does not require the replacement of charts. It is less sensitive to the environment and can be made in a smaller and less expensive package. It also provides for convenient insertion of a new map within the graphical display area of the plotter.

The plotter of the invention offers many of the graphical display capabilities of the CRT-based systems, such as the ability to display X's or other indicia for an initial location, a current vessel location, a remote location or destination, to aid navigators in visualizing the navigation situation. Projected paths or courses may be indicated by dotted lines.

The plotter of the invention has advantages over the CRT-based systems in offering a less bulky display and allowing use of physical maps rather than requiring software-generated maps. The initialization sequence is quick, easy and uncomplicated, based on visual observation, and the device can store the necessary parameters for a plurality of maps and courses.

Other objects and advantages besides those discussed above shall be apparent to those experienced in the art from the description of a preferred embodiment of the invention which follows. In the description, reference is made to the accompanying drawings, which form a part hereof, and which illustrate examples of the invention. Such examples, however, are not exhaustive of the various alternative forms of the invention, and therefore reference is made to the claims which follow the description for determining the scope of the invention.

DETAILED DESCRIPTION OF THE PREFERRED EMBODIMENT

Figure 1:
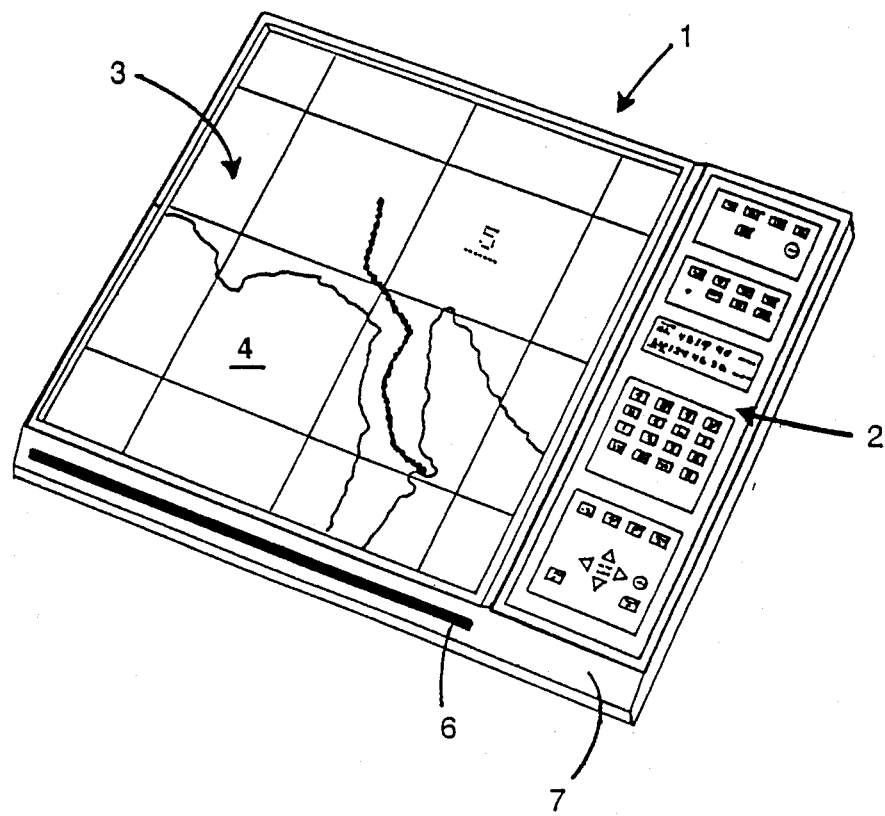
FIG. 1 is a perspective view of an electronic device which incorporates the present invention.

Referring to FIG. 1, an electronic plotter 1 of the present invention includes a control section 2 with keyboard and numeric display and—to the left of the control section 2—a graphical display section 3. The graphical display section 3 includes a graphical display element 4, which in this embodiment is a light-transmissive LCD (liquid crystal display) element. A map 5 is positioned underneath and behind the graphical display element 4 by sliding it into a map slot 6 formed in a base 7 of the plotter 1. Four rectilinear sides of the display section 3 form a window frame that defines an area of the map 5 that is viewed through the graphical display window 4. In addition, the map 5 may be held closely to the underside of the graphical display element 4 and secured in registration with the viewing area with tabs or brackets (not shown).

It is to be understood, however, that the invention also contemplates other, more minimal means of defining a viewing area for the map 5. For example, the graphical display section 3 can be formed with four rectilinear sides and an open bottom to allow positioning of the graphical display window frame over a portion of the map 5, where the map 5 is supported by the same surface supporting the base 7 of the plotter 1.

The map 5 may be sized to fit the map slot 6 or it may be folded down to an area of interest corresponding to the area of the graphical display element 4. In certain embodiments, it may be desirable to use a plastic-coated, weather-resistant map 5.

Figure 2:
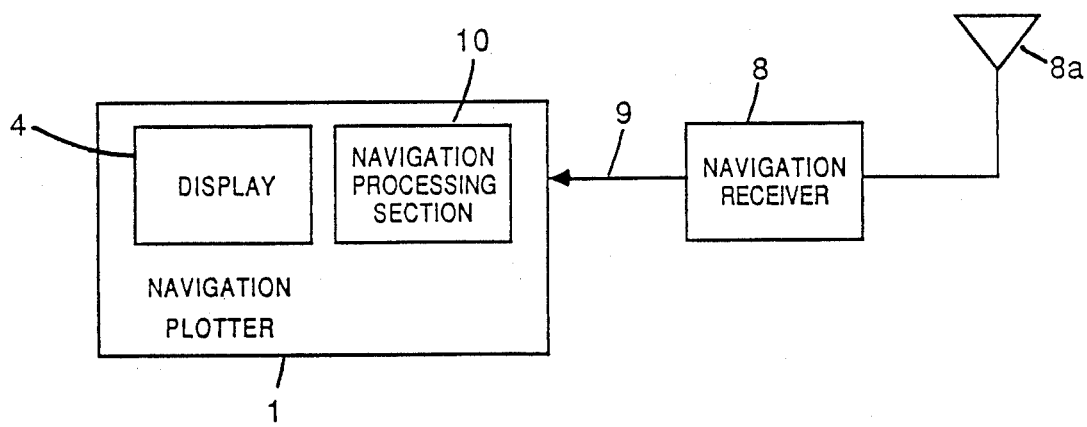
FIG. 2 is a block diagram illustrating the connection of the subject plotter to a navigation instrument such as a LORAN receiver.

Referring now to FIG. 2, the plotter 1 is connected to a navigation receiver 8, such as a LORAN C unit, via a communication cable 9. The navigation receiver 8 receives radio-navigation signals from LORAN transmitting stations through an antenna 8a. The output of the navigation receiver 8 is the current latitude and longitude as calculated by the receiver 8 after reception of the navigation signals. The navigation receiver 8 also transmits position data signals as serial data through the communication cable 9 to a navigational processing section 10 formed on one or more circuit boards located in the base 7 of the plotter 1. The navigation processing section 10 translates the position data signals from the navigation receiver 8 to navigational positions on the graphical display, by performing various calculations to relate the signals to the display 4 and the map 5.

Figure 3:
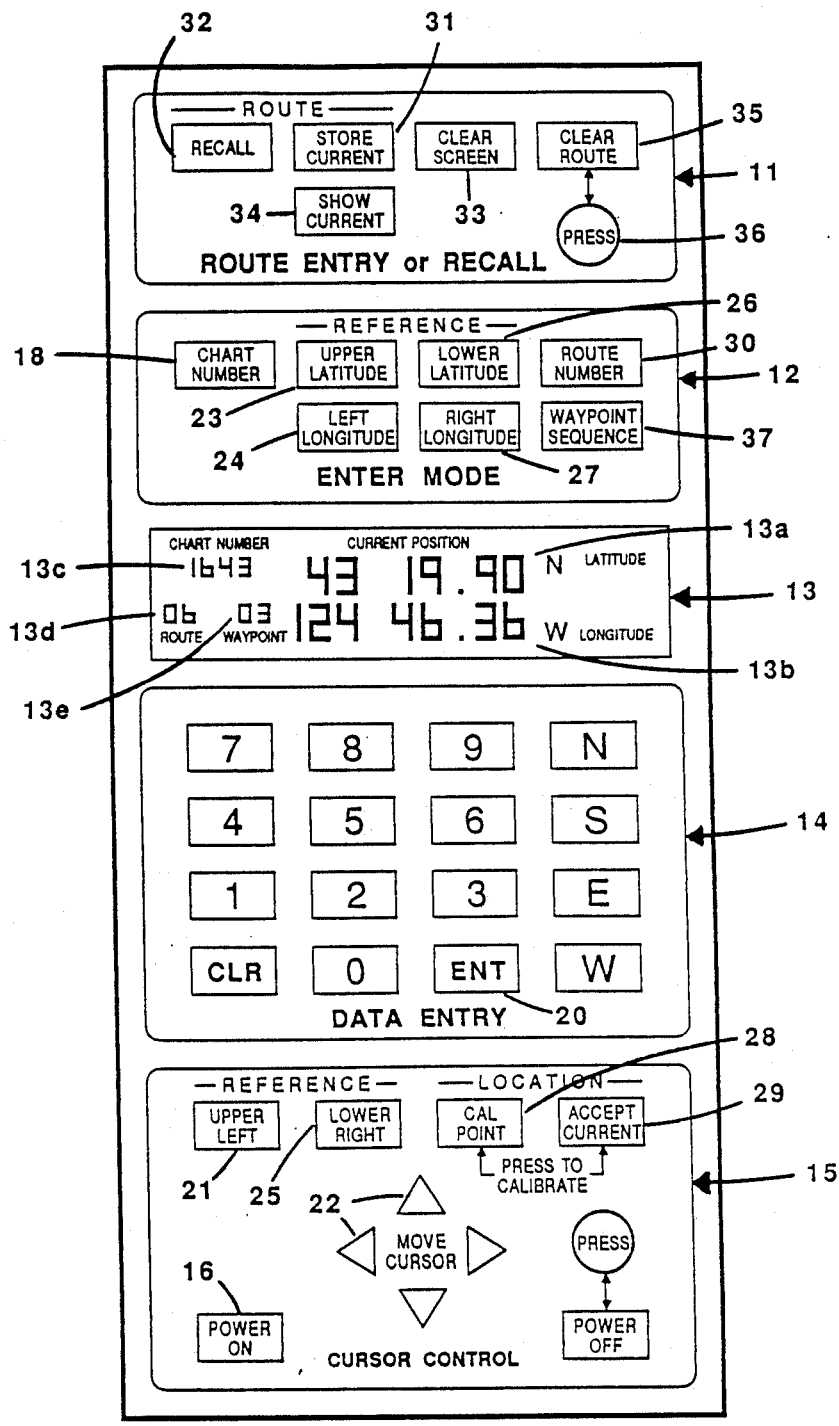
FIG. 3 is a plan view of the keyboard and control section of the subject plotter.

FIG. 3 shows that the control section 2 has been subdivided into five distinct areas or sections. The first of these is the ROUTE ENTRY OR RECALL section 11 with keys for entering a set of commands related to route entry and recall. Continuing downwardly, the next section is the ENTER MODE section 12, with keys for entering and characterizing certain numbers as chart numbers, route numbers, waypoints, latitude or longitude readings. The third section is provided by a numeric display 13 with portions 13a–13e for showing chart numbers, route numbers, waypoints, and latitude or longitude readings, so that these can be verified by the user before entering them as the basis for further operations. The fourth section is a DATA ENTRY section 14 with keys for numbers "0"-"9", directions "N", "S","E", and "W", and the clear ("CLR") and enter ("ENT") functions. The fifth section is a CURSOR CONTROL section 15 with function keys related to calibration functions with cursor control keys.

Figure 4:
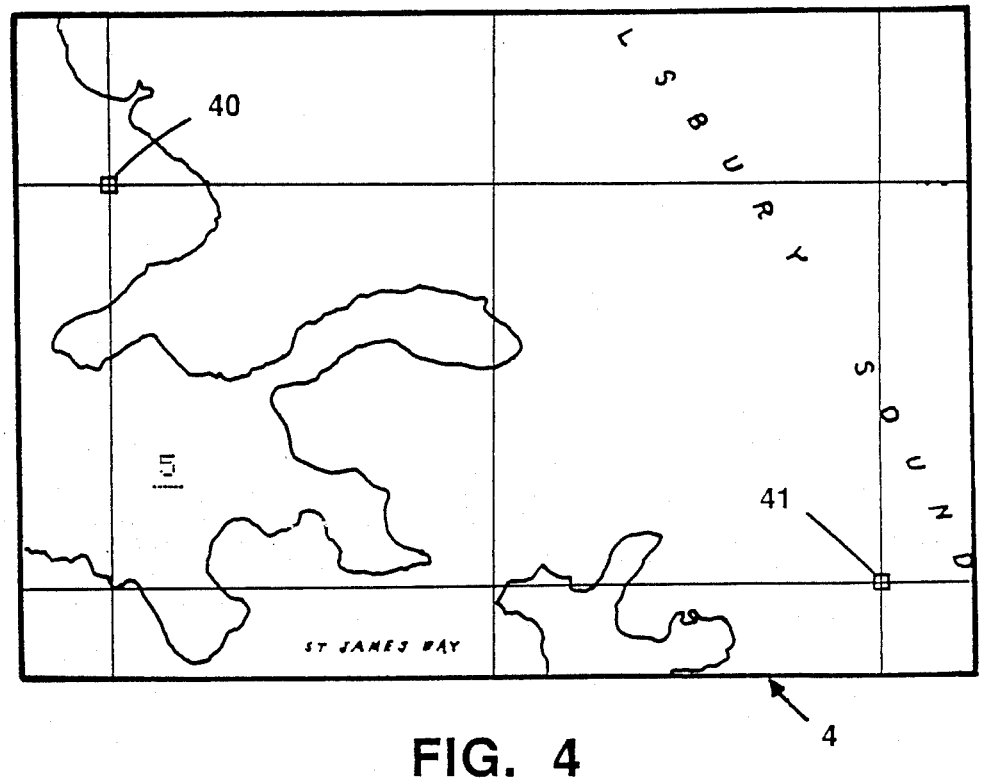
FIG. 4 is a view of the graphical display section of the plotter with a map positioned for calibration.

To operate the plotter, the navigation receiver 8 is turned on first to acquire initial navigation signals, and then the plotter 1 is turned on by pressing the Power On key 16. The initialization program (block 66 in FIG. 7) in the navigation processing section 10 causes the latitude section 13a of the numeric display 13 to read NS 88:88.88, and the longitude section 13b of the numeric display 13 to read EW 188:88.88. The other portions 13c–13e of the numeric display 13 will read all 8's. During an initial period of about three seconds the plotter 1 continues with this display while certain internal diagnostics and self-checks are made. If diagnostics are successfully completed, the plotter 1 is programmed to automatically switch into the normal operating mode, which it signals by displaying the current latitude/longitude as received from the navigation receiver 8. The user then inserts a map 5 into the slot 6 for viewing through the graphical display element 4 as seen in FIG. 4, or if using a large navigation chart, the chart is folded, or in the alternative embodiment mentioned earlier, the graphical display element 4 is positioned over the area of interest.

To use a particular map with the plotter 1, the plotter must be calibrated to the map 5. Once the plotter 1 has been calibrated for a particular map 5, the calibration parameters can be saved for easy recall in the future. With every map, two calibration points will be established which define two known positions in terms of the latitude and longitude and in terms of the physical locations on the graphical display 4. With this information the navigational processing section 10 can determine the X and Y distances between the calibration points in terms of latitude and longitude and can determine a scale factor that must be applied to the positional information being received from the navigation receiver 8.

The navigational processing section 10 also maintains a map in memory of all pixel locations on the graphical display 4, so it can relate the positional data signals received from the navigation receiver 8 to points on the graphical display 4. Appropriate LCD pixels are activated to indicate navigational positions.

The first step in calibrating a map 5 positioned in the map slot 6 is the entry of a chart number to be associated with a pair of calibration points.

To enter a chart number, a Chart Number key 18 is pressed. The Chart Number portion 13c of the numeric display 13 will indicate an all zero numeric value with the most significant digit flashing to indicate the number position where new digits can be entered using the keys in the DATA ENTRY section 14. Chart numbers up to five (5) digits in length can be shown in response to inputs from the numeric keys. When the desired number appears, it is entered by the pressing of the "ENT" key 20.

Figure 5:
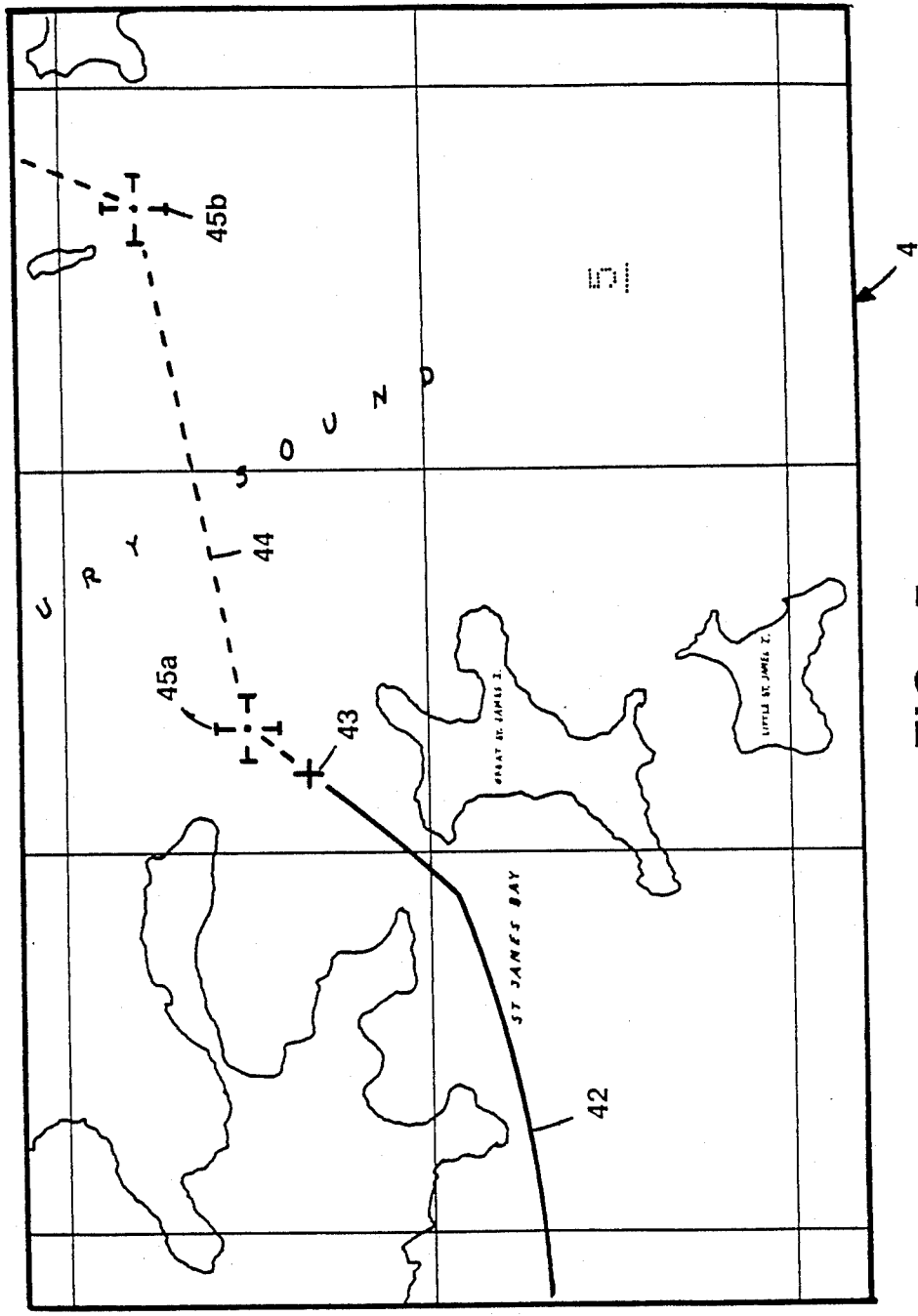
FIG. 5 is a second view of the graphical display portion of the plotter showing present position and course points.

Next, the two calibration points are established. The graphical display 4 is provided with two reference indicia 40 and 41 at separate and diagonally opposite locations as seen in FIGS. 4 and 5. These may be locations displayed by illuminating pixels at these locations, or they may be physical marks made on the face of the screen of the LCD 4. The user reads the map to determine exact latitude and longitude of the points on the map 5 which lies beneath the reference indicia.

Assuming the upper left calibration point is to be established first, the Upper Left Reference key 21 in the CURSOR CONTROL section 15 is pressed. A flashing symbol in the shape of an "X" is displayed on the LCD screen 4 at the upper left reference point 40 and by operating the cursor arrows 22, a cursor symbol is moved to the point on the map 5 where the reference point is located. The Upper Latitude Reference key 23 in the ENTER MODE section 12 is then pressed and using the keys in the DATA ENTRY section 14, the exact latitude is entered. This entry sequence is terminated by pressing the ENT key 20. A similar entry is made for the longitude data for this position by pressing the Left Longitude Reference key 24 and following the same sequence for numeric data entry.

Next, lower right calibration point is established. The Lower Right Reference key 25 in the CURSOR CONTROL section 15 is pressed and the cursor is moved to the second reference mark by operating the cursor arrows 22 in the CURSOR CONTROL section 15. The Lower Latitude Reference key 26 in the ENTER MODE section 12 is then pressed and using the keys in the DATA ENTRY section 14, the exact latitude is entered. This entry sequence is terminated by pressing the ENT key 20. A similar entry is made for the longitude data for this position by pressing the Right Longitude Reference key 27 and following the same sequence for numeric data entry. When the ENT key is operated to enter longitude, the two calibration points have been established and related to the chart number that was first entered as described above. This pair of calibration points and associated chart number will be retained in processor memory for later recall unless the user decides to eliminate this particular chart. This can be accomplished by setting the chart number to zero.

Once a map has been calibrated as previously described, the calibration points will be recalled from memory whenever the chart number is entered. The navigation processing section 10 then executes a portion of its program to verify the calibration points. The reference points are indicated in succession by illumination or blinking on the graphical display 4 and the latitude and longitude for each calibration point is displayed to allow the user to verify the identity and position of the corresponding map.

The process of map calibration is necessary only to establish the scale and reference points relating to the display area to be plotted. The user is not restricted to any particular orientation of the map in the display window, such as a compass or true North direction. The user may elect to cut a larger chart and insert the portion into the window or the user may elect to simply place the window over the chart, to select the area of interest. The plotter 1 is thus advantageous in customizing plots of fishing grounds, navigating through hazardous areas, for scientific studies of a particular area or ocean bottom or for obtaining positional data in any other detailed area of interest.

After the display has been calibrated to a map, it is also desirable to calibrate the plotter 1 to the navigation receiver 8. Due to certain phenomena, time delays and phase changes may occur in radio-navigation signals and may cause the apparent position of the vessel to vary from the actual position. Some correction is provided within the navigation receiver 8 itself in the form of secondary phase corrections or additional secondary factor (ASF) corrections to compensate for these deviations. Nevertheless, it may be easier to include correction factors in the scaling and conversion calculations within the navigational processing section 10.

To perform this second type of calibration, an observable, well known point or benchmark, such as a dock, harbor entrance or other navigational marker, is selected and the vessel is moved to this point. Using the cursor keys 22, the user then moves the cursor to the location of the benchmark on the map 5. Then the user operates the Calibration Point (CAL POINT) key 28 in the CURSOR CONTROL section 15 to designate the point for calibration. The vessel should be at zero velocity for purposes of this calibration. A reading of the apparent latitude and longitude is then taken through the navigation receiver 8. The Accept Current Location key 29 is then operated to accept the readings from the navigation receiver 8. The navigational processing section 10 responds by comparing the latitude and longitude for the point on the map to the data received from the navigation receiver 8. If there is a difference, the difference is applied as a correction factor to further navigation position signals received from the navigation receiver 8. It could also be applied to positional data previously accumulated through the navigation receiver 8.

In many instances it may be desirable to save a plotted navigational path for future reference. By establishing a unique route number that is associated with the displayed path, the route can be identified by the navigational processing section 10 for later recall and display. It is first necessary to assign a unique number to the current route. This is accomplished by pressing the Route Number key 30 in the ENTER MODE section 12, which selects the appropriate portion 13d of the numeric display 13. A two-digit route number is then entered for display using the keys in the DATA ENTRY section 14. As a navigational path is traversed it may be displayed as a solid line, whereas a route recalled from memory or an intended route may be displayed by a dashed or dotted line to distinguish it from a current route. After a route has been traversed, it can be saved by pressing the Store Current Route key 31 in the ROUTE ENTRY OR RECALL section 11. Whenever the user wants to see any stored route, the Recall Route key 32 is pressed in the same key area and the route number is entered using the keys in the DATA ENTRY section 12. The navigation processor 10 is programmed to show the last route retrieved from memory unless the user elects to clear the display by pressing the Clear Screen key 33 in the ROUTE ENTRY OR RECALL section 11. It is also possible to show an old route and the current route by pressing the Show Current Route key 34 in the same area after the recall of the route using the procedure previously described.

Once a route is no longer needed, it can be removed from the processor memory by pressing the Clear Route key 35, subsequently entering the desired route number if different from the current one, and then simultaneously pressing the Clear Route 35 and Press keys 36. The plotter 1 also provides the user with the ability to enter a sequence of navigational paths connected together by waypoints which can be shown on the display in the manner of a previously stored route. In FIG. 5 a portion of a map 5 is positioned under the graphical display 4. The display 4 shows a Present Course 42, a Present Position 43, a Projected Course 44 and Waypoints 45a and 45b. To enter a Projected Course 44 with Waypoints 45a and 45b, the user first enters a route number using the Route Number and DATA ENTRY keys as previously described. The Route Number is displayed in the Route Number portion 13d of the numeric display 13. The user then operates a Waypoint Sequence key 37, and the navigational processing section 10 responds by generating signals to cause the first number in a sequence of numbers to be displayed in the Waypoint portion 13e of the numeric display 13. The cursor is moved to the first waypoint 45a using the cursor keys 22 and the location of the waypoint is entered using the ENT key 20. The sequential waypoint number is then automatically incremented in the display 13e and the cursor is moved to the second waypoint 45b, where the location of the waypoint is entered using the ENT key 20. When the second and subsequent waypoints are entered, the navigational processing section 10 directs the display 4 to show a dashed or dotted line 44 for the intended course. The route and waypoint information is stored in memory as it is entered for later recall.

Figure 6:
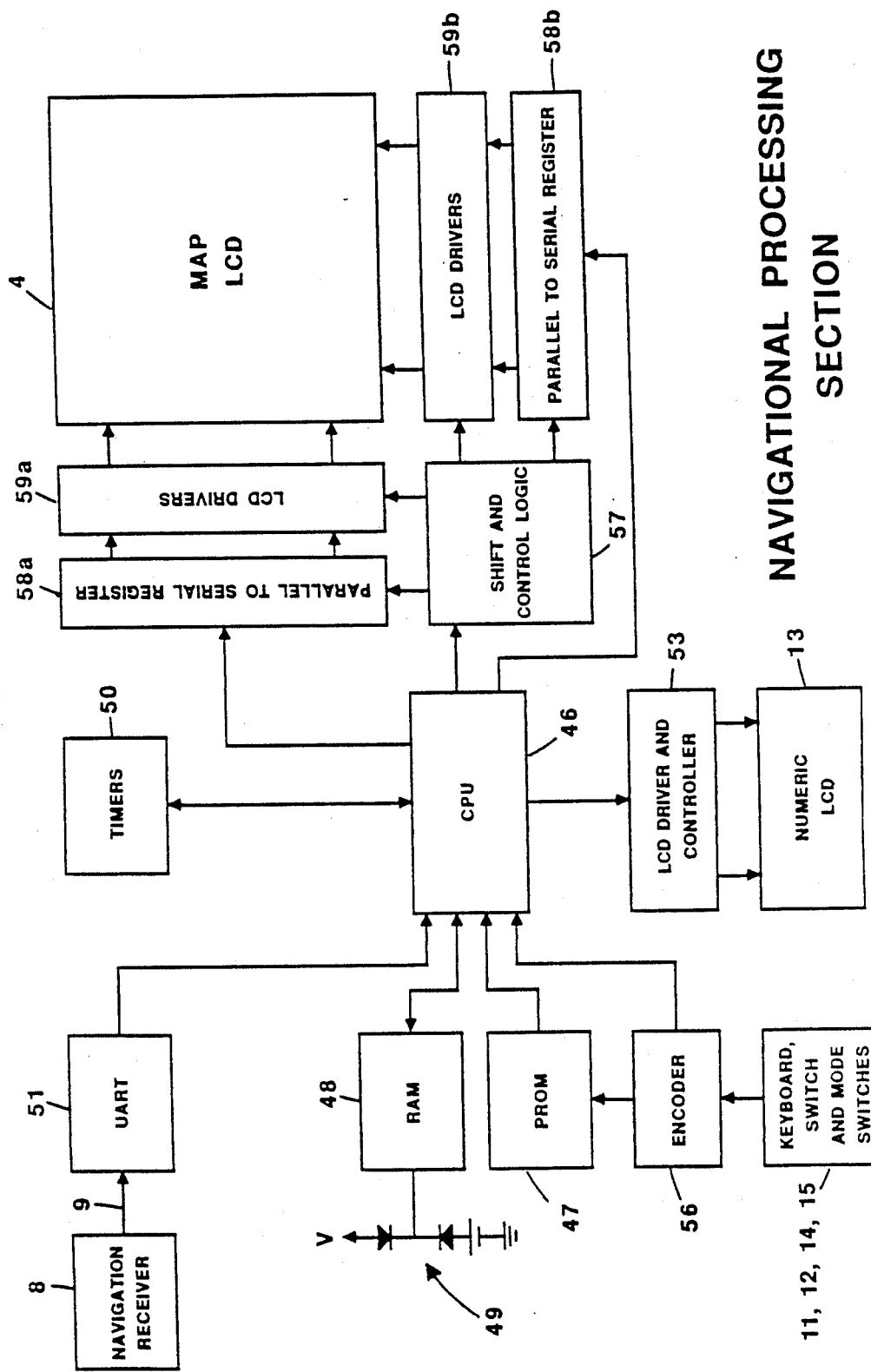
FIG. 6 is a block diagram of the electronic circuitry in the plotter of FIG. 1.

FIG. 6 shows the circuitry in the navigational processing section 10, which includes the necessary circuitry to drive the graphical display 4. A microelectronic CPU (central processing unit), which is also referred to in this description as the navigation processor 46, is the primary controlling element or brain of the plotter 1. It is connected to the other circuitry by address and data buses and various control lines of a type well known in the art. It is connected to a PROM (programmable read-only memory) 47 which contains a stored program of instructions and constants in object code. The navigation processor 46 addresses the PROM 47 through the address bus, reads the instructions into its own registers and then executes the instructions to direct and control the functions of the plotter 1. The navigation processor 46 is also connected to a RAM (random access memory) 48 which stores data and temporary results. The RAM 48 is connected to a battery backup circuit 49, which powers a portion of the RAM 48 when the main portion of the plotter 1 is turned off. This provides for retention of route numbers and chart numbers in the RAM 48, when the other portions of the navigational processing section 10 are turned off.

A group of hardware timer circuits 50 is connected to the navigation processor 46 to provide timed interrupt signals that are needed for time-based velocity and communication filtering operations.

A UART (Universal Asynchronous Receiver/Transmitter) 51 is connected through a connector (not shown) on one side to the serial communication cable 9 and on the other side through the data bus to the navigation processor 46. The UART 51 converts between serial data transmitted through the communication cable and parallel data transmitted through the data bus. The UART 51 works with the navigation processor 46 to assemble and disassemble groups of data transmitted through the serial communication cable and to provide timing and checking functions for data from the navigation receiver 8.

In the control section 2 of the plotter 1, the numeric display 13 is interfaced to the navigation processor 46 through an LCD driver and controller circuit 53 of a type well known in the electronic arts. The keys in the keyboard sections 11, 12, 14 and 15 of the plotter 1 are interfaced to the navigation processor 46 through a keyboard encoder circuit 56 of a type well known in the electronic arts. The navigation processor 46 periodically executes a routine of instructions from the PROM 47 to scan the keyboard inputs and detect the operation of various keys. Key inputs are saved and the commanded functions are carried out within a time determined by the overall structure, organization and functions of the full microprocessing program.

In the upper right corner of FIG. 6, the LCD graphical display element 4 includes a large number of pixels or picture elements, which are individually controlled to show forms and objects on the screen of the display 4. The pixels are arranged in an X-Y grid pattern in which each pixel is defined by a row (Y-axis position) and column (X-axis position). The pixels are activated through a first group of LCD drivers 59a for the rows and a second group of LCD drivers 59b for the columns.

The navigation processor 46 is interfaced to the LCD drivers 59a and 59b through respective sets of serial-to-parallel shift registers 58a and 58b and a shift and control logic circuit 57. The navigation processor 46 transmits serial data to each of the sets of shift registers 58a and 58b with control and timing signals provided with the assistance of the shift and control logic circuit 57.

In other embodiments, the LCD 4 can be driven with dedicated controllers that utilize internal character generators and memories dedicated to data to be displayed on the LCD. In such embodiments, it may be assumed that all of the pixels must be activated (even if non-illuminated) and the time available for illuminating each pixel is a fixed subdivision of the total time available to illuminate all of the pixels. Such embodiments may exhibit disadvantages in contrast or clarity of the displayed information.

In the present invention, the graphical representations are for the most part points and lines, not complex letters or diagrams. It is therefore preferred that the navigation processor 46 vary the amount of time that each pixel remains on. The navigation processor 46 is programmed in a display control portion 65 of its program represented in FIG. 7 to recognize when a large number of pixels are to be illuminated, and to generate signals through the above-mentioned interface circuitry to cause certain pixels to be illuminated with less time in the "on" state, than if a smaller number of pixels were to be illuminated. This reduces the intensity of the display for less important parts of the display. The navigation processor 46 is further programmed in the display control portion 65 of its program to extend the time between turn-off and turn-on and sequence each point in time to give the illusion of a flowing or moving trace.

Figure 7:
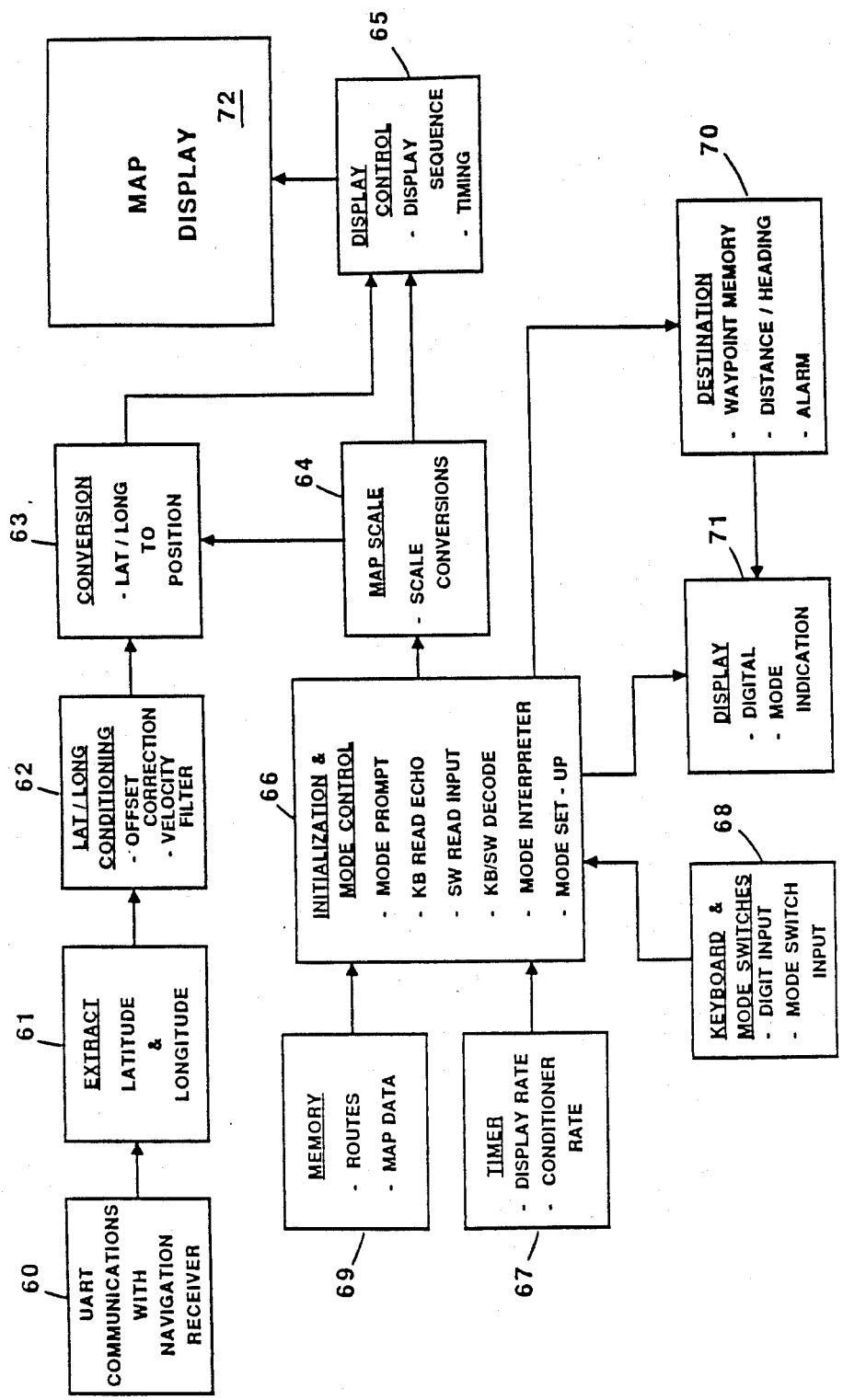
FIG. 7 is a software block diagram illustrating operation of the plotter of FIG. 1.

FIG. 7 illustrates the major portions of the program that is executed by the navigation processor 46 to receive positional data signals and to convert the data to plotted positions. Radio-navigation signals are translated to latitude/longitude format by the navigation receiver 8 and sent as a stream of positional data signals in a communication format such as that specified by NMEA #0183. The navigation processor 46 receives positional data signals through the UART 51 through execution of a portion of a microprocessing program represented by block 60 in FIG. 7. Block 61 represents another part of the program, this part being executed by the navigation processor 46 to extract the latitude and longitude data from the positional data signals received through the UART 51. Once the positional data is extracted, a data conditioning part of the program, represented by block 62, is executed to apply calibration offset factors and to execute velocity filtering to compensate for the speed the vessel is traveling. As represented by block 63, a part of the program is executed to convert the data in latitude-longitude format to plot locations on the LCD screen, based on the initial latitude/longitude information for the reference points that was developed during the process of initialization and calibration.

The positional data is further related to the initial reference points by executing a map scaling portion of the program represented by the Map Scale block 64. A scaling factor is input through the keyboard or pre-stored in memory. Execution of the Map Scale block 64 applies the scaling factor to the positional data signals to relate the displayed navigational positioning to the calibrated points based on the scale of the map.

The data resulting from execution of blocks 60-64 is then passed to a display control portion represented by block 65. This may include a display sequence in which new display information is combined with previously displayed information and may also include timing sequences which allocate less time to illumination of pixels to show less important information as described earlier. The output data from the display control block 65 is loaded into a map storage block for display data that is used to drive the display interface circuitry as described earlier in relation to FIG. 6.

The program for the navigation processor 46 includes a group of initialization and mode control routines 66, which are executed to receive and interpret inputs from hardware interface drivers of the type represented by block 68 and to carry out calibration and other functions which are initiated by various sequences of key inputs. In executing this group of routines 66, logic is implemented to interpret inputs and outputs with regard to various timing considerations in reading inputs and generating outputs. In executing this part of the program, the navigation processor 46 utilizes software timer interrupts generated by routines represented by timer block 67 to control the rate of display and to perform conditioning of data from the navigation receiver 8. Block 68 represents typical subroutines which are used in the art for processing keyboard inputs. During execution of its program, the navigation processor 46 stores and recalls navigational positions, navigational paths or routes and way points from areas in memory represented by blocks 69 and 70. Other areas in memory represented by display block 71 and the map display block 72, store the display data for showing numbers on the numeric display 13 and coordinates and plotted positions on the graphical display 4.

Having above indicated a preferred embodiment of the present invention, it will occur to those skilled in the art that many modifications and alternatives an be practiced within the spirit of the invention. It is accordingly intended to define the scope of the invention only as indicated in the following claims.

What is claimed is:

1. A navigational apparatus for use with a craft, vessel or vehicle, the apparatus comprising:
   a graphical display which is at least semi-transparent and which has a plurality of pixels, wherein the pixels can be selectively illuminated to show navigational positions;
   means behind the graphical display for defining a viewing area in which a map is positioned for viewing through the graphical display;
   communication circuitry that is connectable to a navigational receiver for receiving positional data signals from the navigational receiver;
   a navigational processing means operatively connected to the communication circuitry to receive positional data signals from the navigational receiver;
   wherein the navigational processing means includes means for relating the positional data signals to navigational positions; and
   wherein the means for relating generates signals to cause the graphical display to show navigational positions superimposed on the map.

2. The navigational apparatus of claim 1, wherein the navigational processing means includes means for storing a series of positional data signals over time that constitute a navigational path;
   further comprising input means for entering commands to store and recall the navigational path; and
   wherein the navigational processing means is operatively connected to the input means and is responsive to the commands from the input means to store and recall the navigational path and to generate signals to cause the navigational path to be displayed on the graphical display and superimposed on the map.

3. A navigational apparatus for use with a craft, vessel or vehicle, the apparatus comprising:
- a graphical display which is at least semi-transparent and which has a plurality of pixels, wherein the pixels can be selectively illuminated to show a cursor that moves from point to point and wherein the pixels can be selectively illuminated to show navigational positions, the graphical display having at least two reference indicia at separate and diagonally opposite positions corresponding to two respective locations on a map received behind the screen element;
- means behind the graphical display for defining a viewing area in which a map is positioned for viewing through the graphical display;
- a first input means for entering latitude and longitude information;
- a second input means for entering first commands to move the cursor into coincidence with each of the reference indicia in turn and for entering second commands for associating each of the reference indicia with respective latitude and longitude information entered through the first input means;
- a navigational processing means operatively connected to the first and second input means, the navigational processing means being responsive to the first commands received from the second input means to cause the selective illumination of pixels on the graphical display means to display the cursor, and the navigational processing means also being responsive to the second commands for associating each of the reference indicia with respective latitude and longitude information entered through the first input means to provide a pair of calibrated points;
- communication circuitry that is connectable to a navigational receiver for receiving positional data signals from the navigational receiver;
- wherein the navigational processing means is also operatively connected to the communication circuitry to receive positional data signals from the navigational receiver;
- wherein the navigational processing means includes means for relating he positional data signals to the calibrated points; and
- wherein the means for relating generates signals to cause the graphical display to show navigational positions on the map in relation to the calibrated points.

4. The navigational apparatus of claim 3, wherein the reference indicia are provided by selectively illuminating certain pixels in the graphical display.

5. The navigational apparatus of claim 3, wherein the means for relating the positional data signals to the calibrated points includes means for applying scaling factors to the positional data signals to relate the displayed navigational positions to the calibrated points based on the scale of the map.

6. The navigational apparatus of claim 3, further comprising
- third input means for entering a chart number associated with a map and a pair of calibrated points,
- further comprising fourth input means for entering commands to store and recall the pair of calibrated points in association with the chart number; and
- wherein the navigational processing means is operatively connected to the third input means and to the fourth input means and is responsive to the commands from the fourth input means to store and recall the calibrated points and to generate signals to cause the navigational positions to be displayed on the graphical display in relation to the calibrated points.

7. The navigational apparatus of claim 3, wherein
the navigational processing means includes means for storing a series of positional data signals over time that constitute a navigational path;
further comprising fifth input means for entering commands to store and recall the navigational path; and
wherein the navigational processing means is operatively connected to the fifth input means and is responsive to the commands from the fifth input means to store and recall the navigational path and to generate signals to cause the navigational path to be displayed on the graphical display means in relation to the map.

* * * * *